(12) United States Patent
Grey et al.

(10) Patent No.: US 11,917,026 B2
(45) Date of Patent: Feb. 27, 2024

(54) DYNAMIC MAPPING AND INTEGRATION VIA A META-MODEL DEFINITIONAL PLATFORM

(71) Applicant: Mutara, Inc., San Ramon, CA (US)

(72) Inventors: Laurence Karl Grey, San Ramon, CA (US); Brian Mark Sparling, Fremont, CA (US)

(73) Assignee: Mutara, Inc., San Ramon, CA (US)

( * ) Notice: Subject to any disclaimer, the term of this patent is extended or adjusted under 35 U.S.C. 154(b) by 4 days.

(21) Appl. No.: 17/584,373

(22) Filed: Jan. 25, 2022

(65) Prior Publication Data

US 2022/0239759 A1    Jul. 28, 2022

Related U.S. Application Data

(60) Provisional application No. 63/251,480, filed on Oct. 1, 2021, provisional application No. 63/142,975, filed on Jan. 28, 2021.

(51) Int. Cl.
| | |
|---|---|
| *H04L 67/00* | (2022.01) |
| *G06F 16/25* | (2019.01) |
| *G06F 16/22* | (2019.01) |
| *G06F 16/178* | (2019.01) |

(52) U.S. Cl.
CPC ......... *H04L 67/34* (2013.01); *G06F 16/1794* (2019.01); *G06F 16/2291* (2019.01); *G06F 16/258* (2019.01)

(58) Field of Classification Search
CPC ... H04L 67/34; G06F 16/2291; G06F 16/258; G06F 16/1794
See application file for complete search history.

(56) References Cited

U.S. PATENT DOCUMENTS

| | | | |
|---|---|---|---|
| 6,076,090 A | 6/2000 | Burroughs et al. | |
| 2003/0018832 A1* | 1/2003 | Amirisetty | G06F 9/465 719/328 |
| 2007/0073769 A1* | 3/2007 | Baikov | H04L 67/02 |
| 2007/0219976 A1* | 9/2007 | Muralidhar | G06F 16/84 |

(Continued)

FOREIGN PATENT DOCUMENTS

DE    112017006689 T5    9/2019

*Primary Examiner* — Kris E Mackes
*Assistant Examiner* — Lin Lin M Htay
(74) *Attorney, Agent, or Firm* — Carr & Ferrell LLP

(57) ABSTRACT

Systems and methods are presented herein for dynamic mapping and integration between one or more software applications via a meta-model definitional application platform. This may comprise receiving from a target system an at least one input data object or request; loading an at least one meaningful data object from a meta-model definitional application platform into a memory, the at least one meaningful data object containing one or more definitions; identifying, via a queue service manager, an integration type definition of the at least one input data object or request; loading, based on the integration type definition, the target specific mapping definition; preparing the at least one input data object or request for processing; generating an integration worker for transforming in sequence of the target specific mapping definition, where the transformations are done according to the one or more definitions; generating and transmitting, an at least one output data object.

19 Claims, 8 Drawing Sheets

(56) References Cited

U.S. PATENT DOCUMENTS

2010/0106546 A1* 4/2010 Sproule ................. G06Q 10/10
705/348
2011/0153292 A1* 6/2011 Lane ..................... G06Q 10/06
703/6
2020/0401385 A1 12/2020 Seetharaman et al.

* cited by examiner

DYNAMIC MAPPING AND INTEGRATION VIA A META-MODEL DEFINITIONAL PLATFORM

The present application claims the priority benefit of U.S. provisional application No. 63/142,975 titled "Dynamic and Customizable Meta-Model Development Platform" filed on Jan. 28, 2021. This application also claims the priority benefit of U.S. provisional application No. 63/251,480 titled "Customer Driven Service Development and Integration" filed on Oct. 1, 2021.

FIELD OF INVENTION

The present technology pertains to a low code application platform (LCAP) that handles all aspects of an application and its behavior, including complex business logic, user interfaces, user experience, data storage, access, transfer and handling, analytics, security rules and authentication. In particular, but not by way of limitation, the present technology provides systems and methods for dynamic mapping and integration via a meta-model definitional platform.

SUMMARY

In various embodiments the present technology is directed towards a computer implemented method for dynamic mapping and integration between one or more software applications via a meta-model definitional application platform, comprising receiving from a target server, system, database, or computing device an at least one input data object or request; loading from a source server, system, database, or computing device an at least one meaningful data object from a meta-model definitional application platform into a memory, the at least one meaningful data object containing one or more definitions; for each received at least one input data object or request, and via an at least one processor coupled to the memory: transforming the at least one input data object or request into a single normalized and encrypted dataset; identifying, via a queue service manager, an integration type definition of the at least one input data object or request; loading, based on the integration type definition, the target specific mapping definition; preparing the at least one input data object or request for processing; transforming in sequence, based on a sequence of the target specific mapping definition, one or more distinct data elements and their associated values in the at least one input data object or request, where the transformations are done according to the one or more definitions; generating, an at least one output data object; and transmitting the at least one output data object from the source server, system, database, or computing device into the target server, system, database, or computing device.

In several embodiments the transforming in sequence comprises: identifying one or more distinct data elements and their associated values in the at least one input data object or request, based on the one or more definitions; mapping the one or more distinct data elements to the one or more definitions; selecting, one or more relevant functions, to be executed on the relevant identified one or more distinct data elements and their associated values, wherein the functions are defined by the one or more definitions; and executing the relevant one or more functions on the relevant identified one or more distinct data elements and their associated values.

In several embodiments, the preparing the at least one input data object or request for processing comprises: decrypting the single normalized and encrypted dataset produced from the at least one input data object or request; converting data in the at least one input data object or request to an appropriate data type for storage; and creating default values for non-existent data to comply with one or more of: the target specific mapping definition and the one or more definitions.

BRIEF DESCRIPTION OF THE DRAWINGS

In the description, for purposes of explanation and not limitation, specific details are set forth, such as particular embodiments, procedures, techniques, etc. to provide a thorough understanding of the present technology. However, it will be apparent to one skilled in the art that the present technology may be practiced in other embodiments that depart from these specific details.

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

Figure 1:
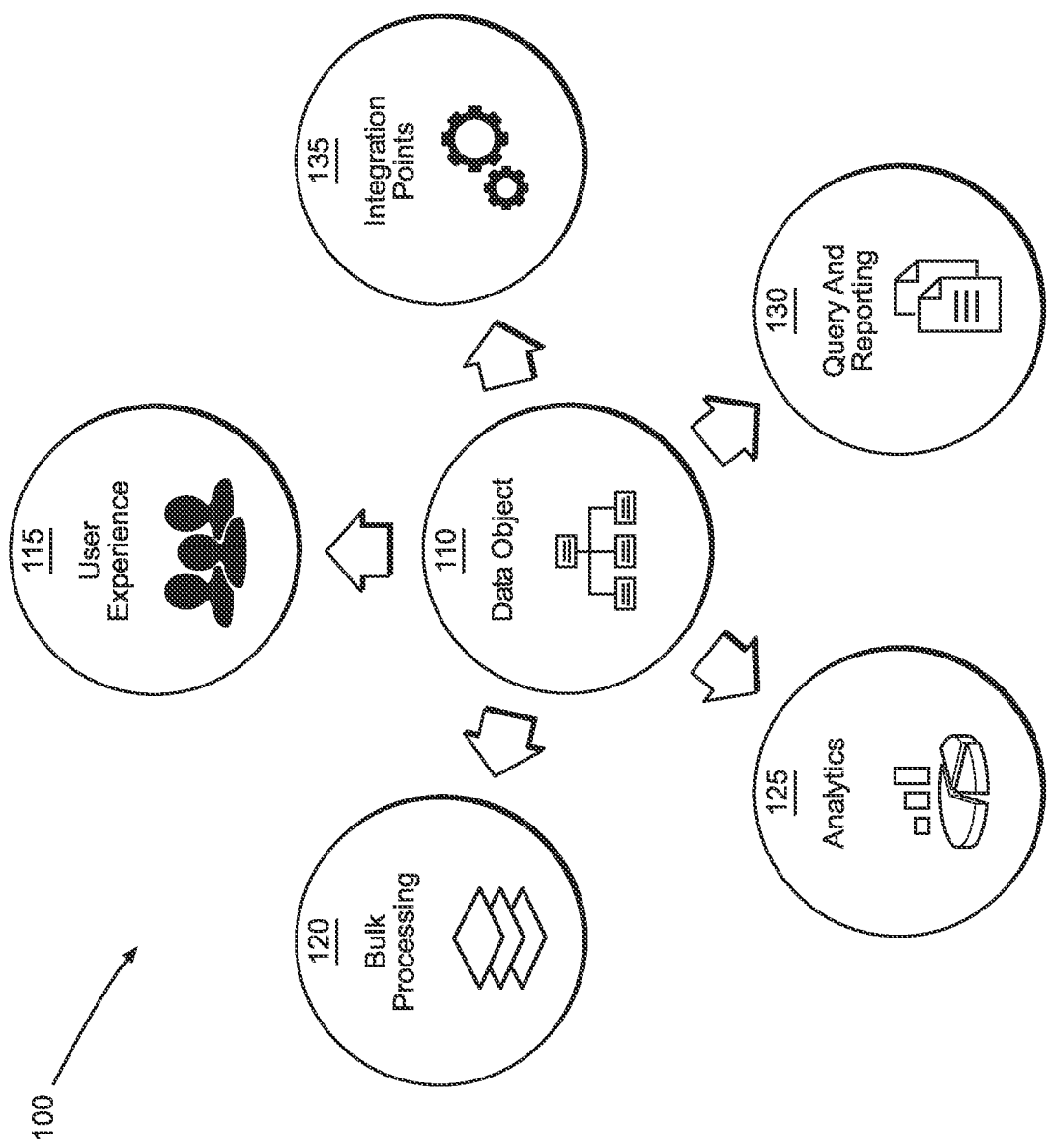

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 1 is a diagrammatical representation of one embodiment of the major components of the development platform.

Figure 2:
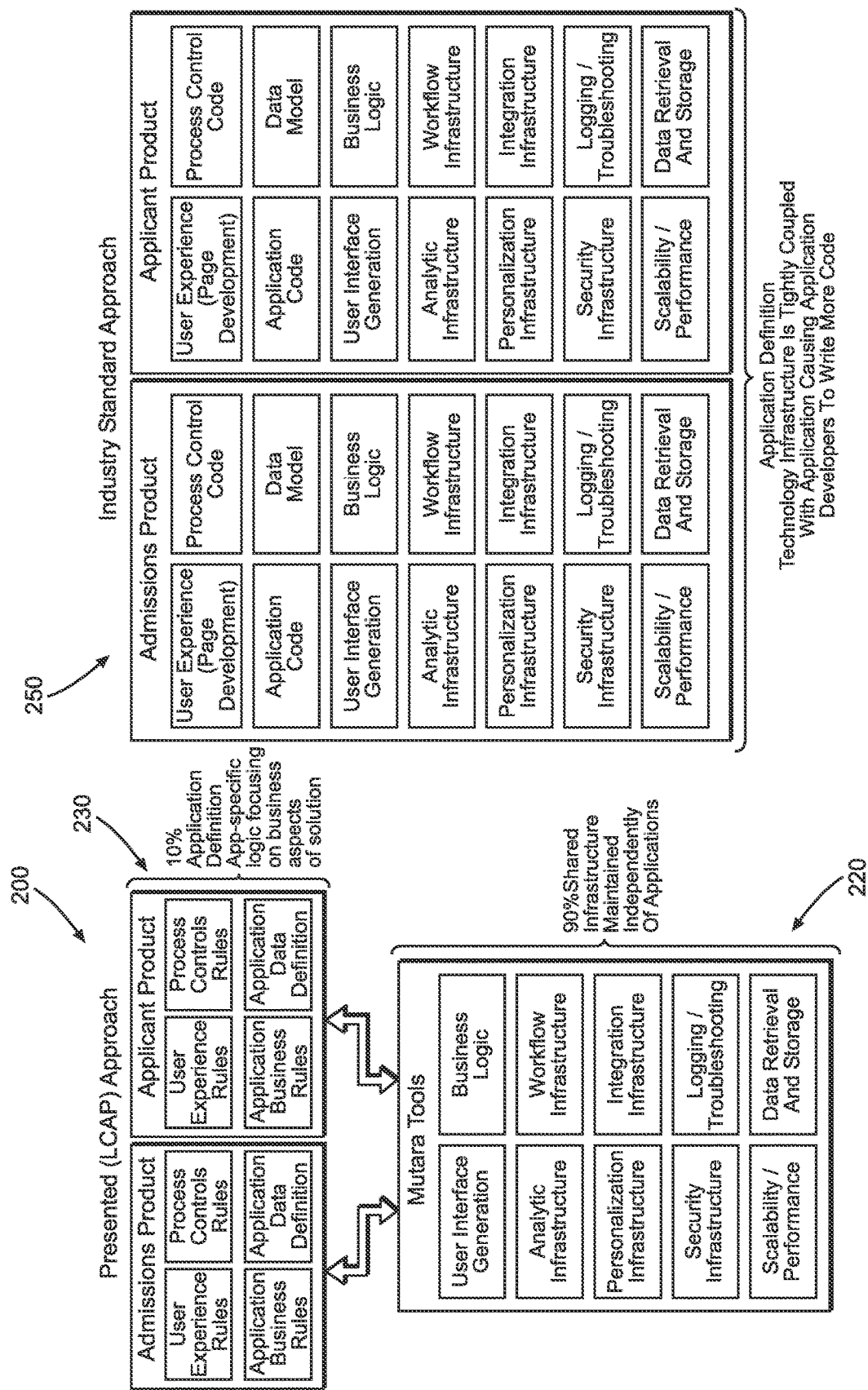

FIG. 2 is a diagrammatical representation of one embodiment of the proposed development platform in comparison to the industry standard approach when building new applications.

Figure 3:
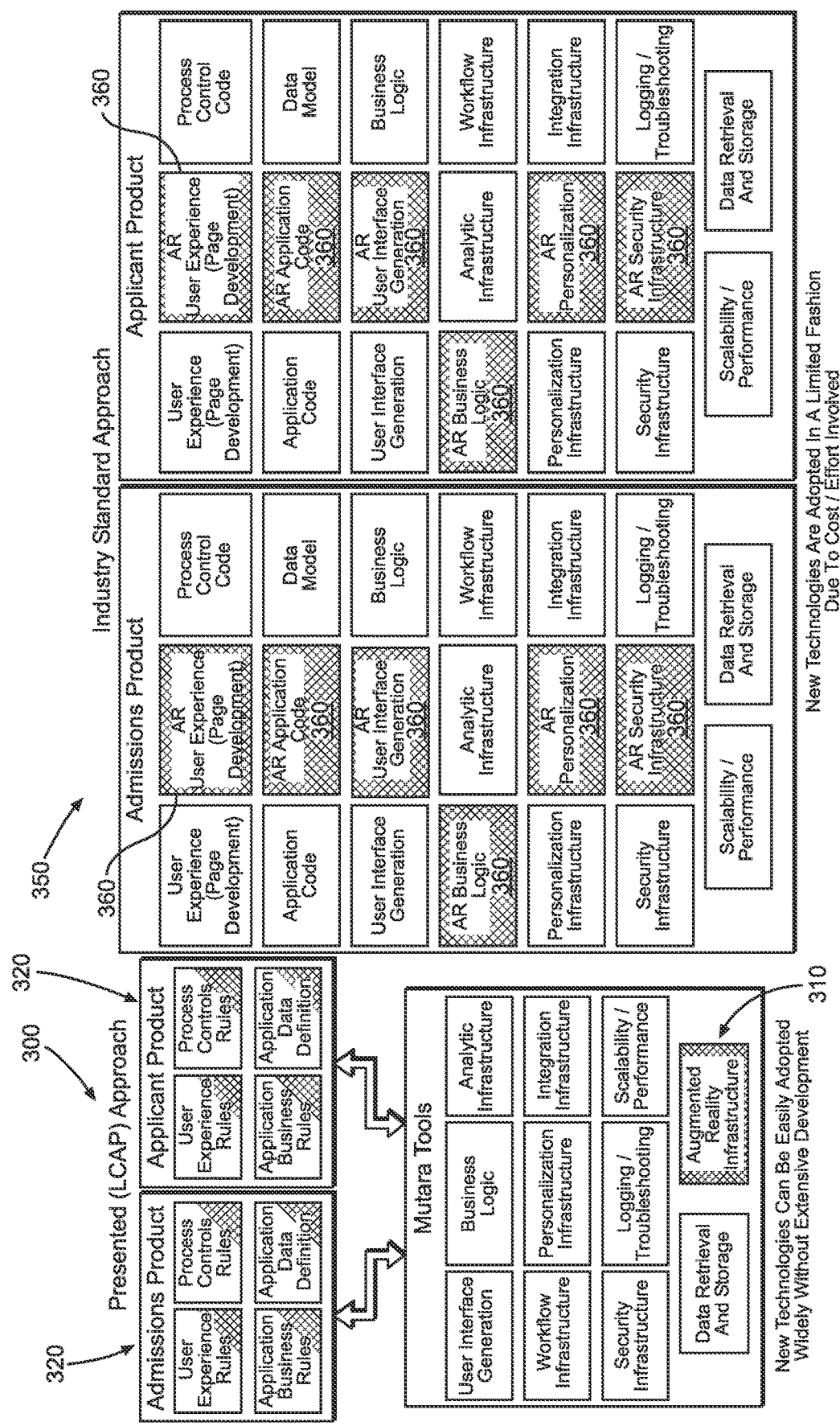

FIG. 3 is a diagrammatical representation of one embodiment of the proposed development platform in comparison to the industry standard approach when adding new features and technologies.

Figure 4:
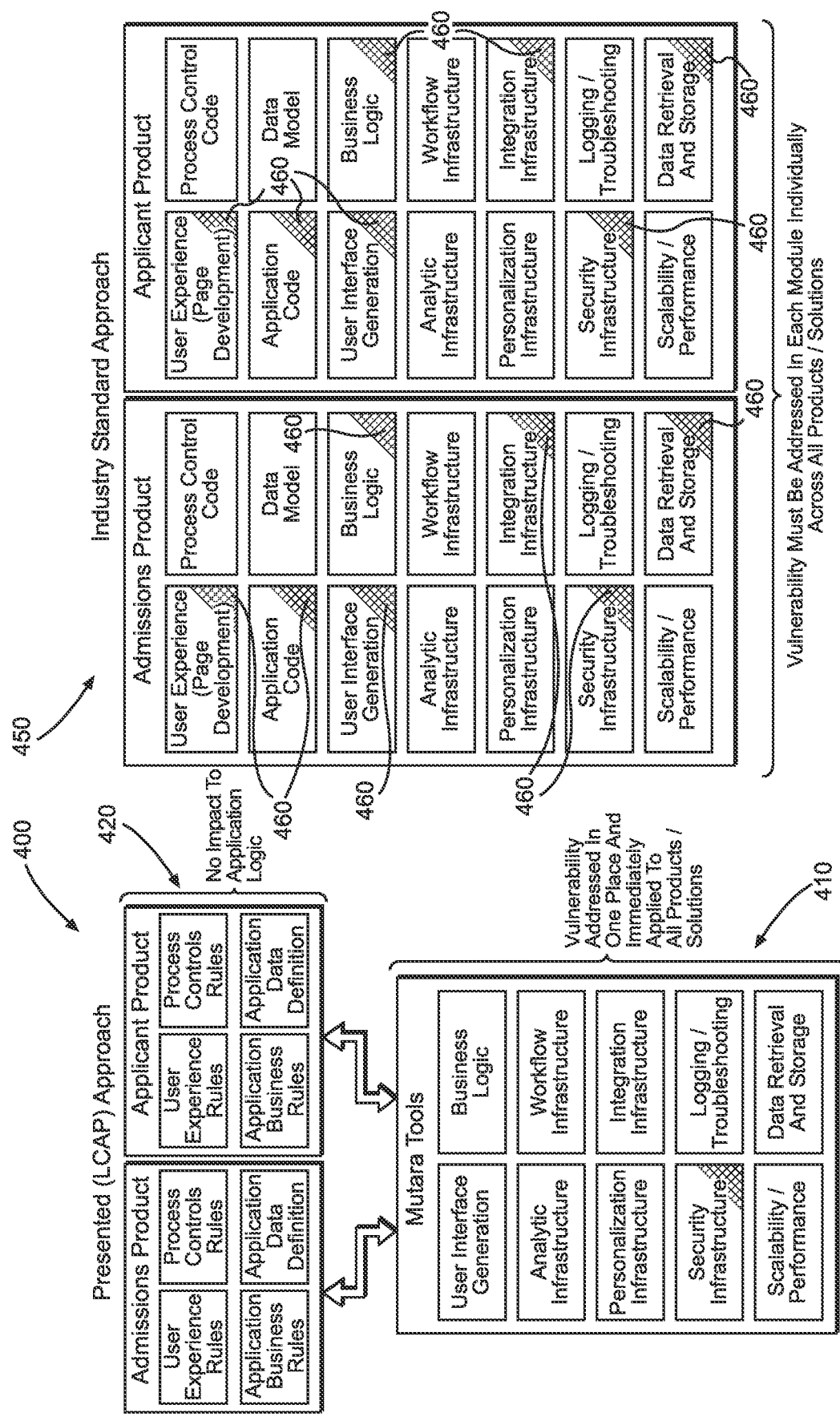

FIG. 4 is a diagrammatical representation of one embodiment of the proposed development platform in comparison to the industry standard approach when addressing security vulnerabilities.

Figure 5:
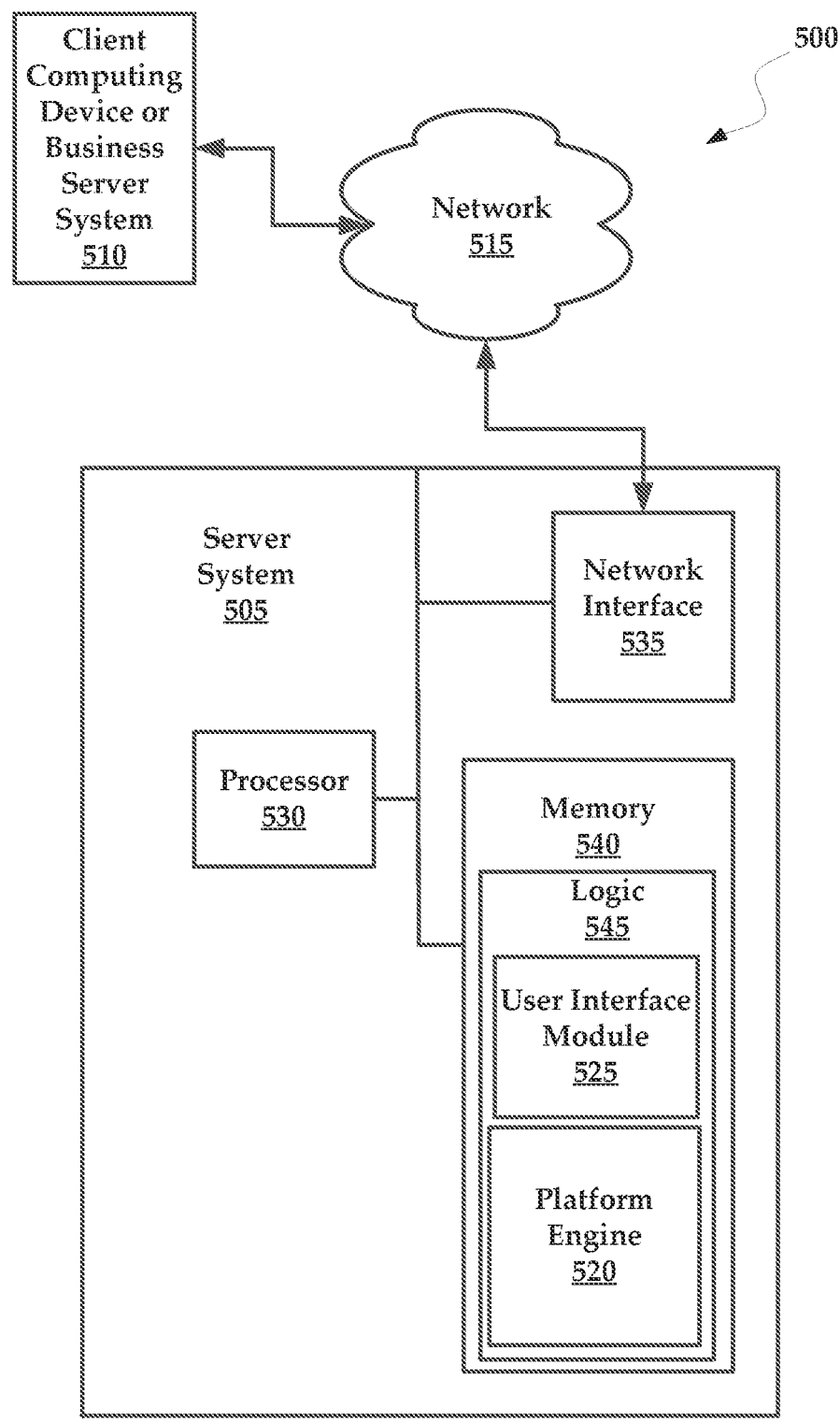

FIG. 5 is a schematic diagram of an exemplary computing architecture that can be used to practice aspects of the present technology.

Figure 6:
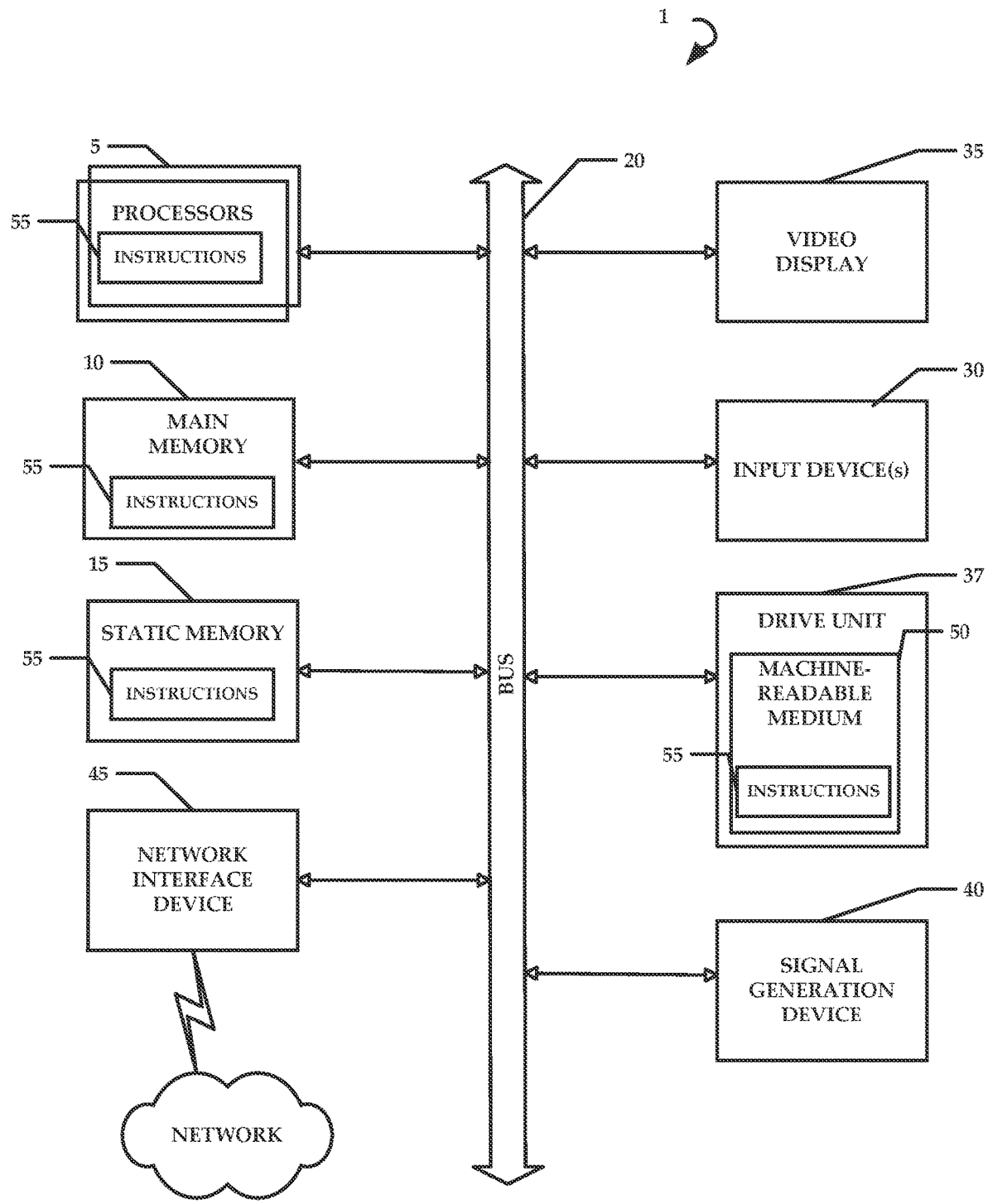

FIG. 6. illustrates a computer system according to exemplary embodiments of the present technology.

Figure 7:
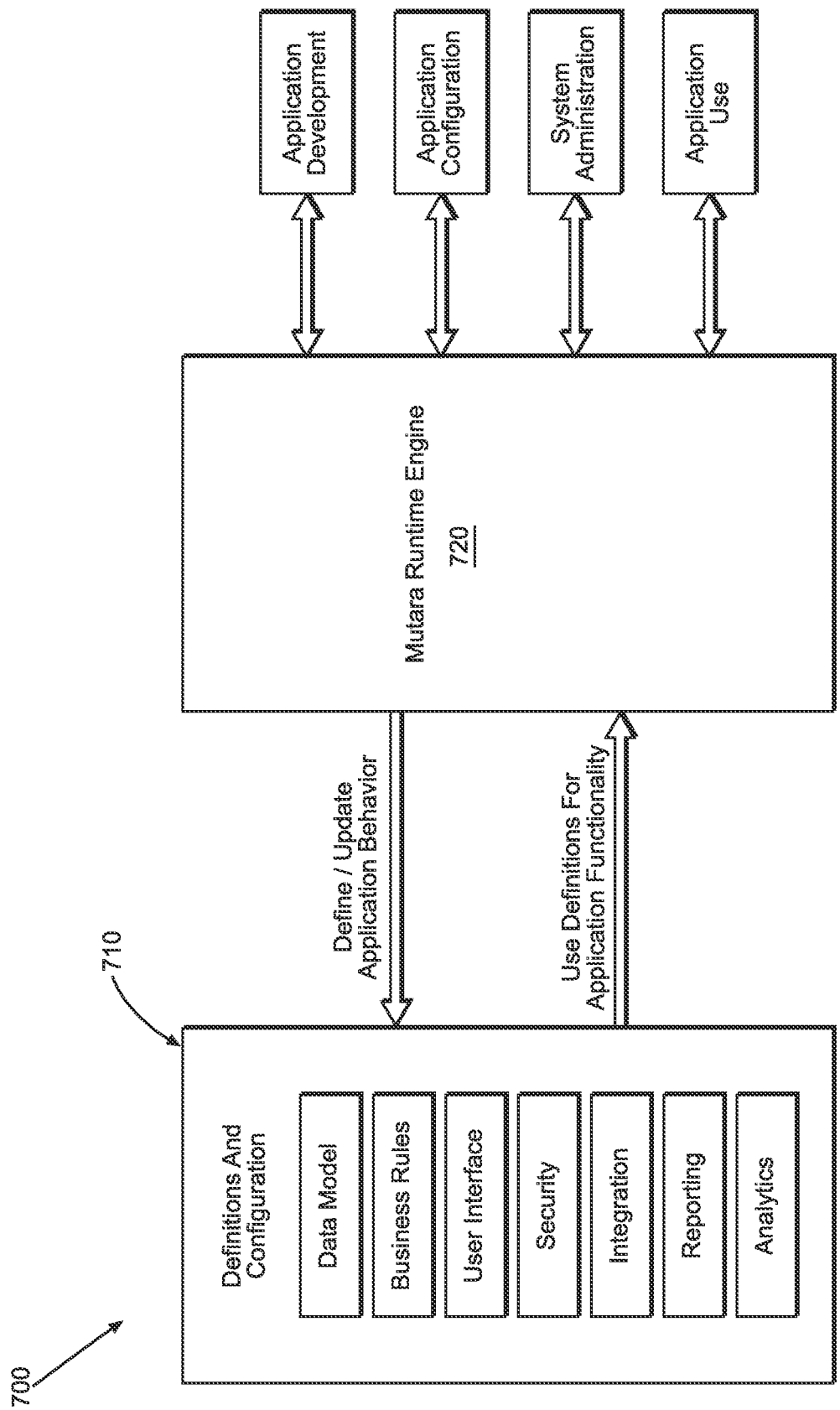

FIG. 7. is a diagrammatical representation of one embodiment of the separate components that make up the platform's architecture.

Figure 8:
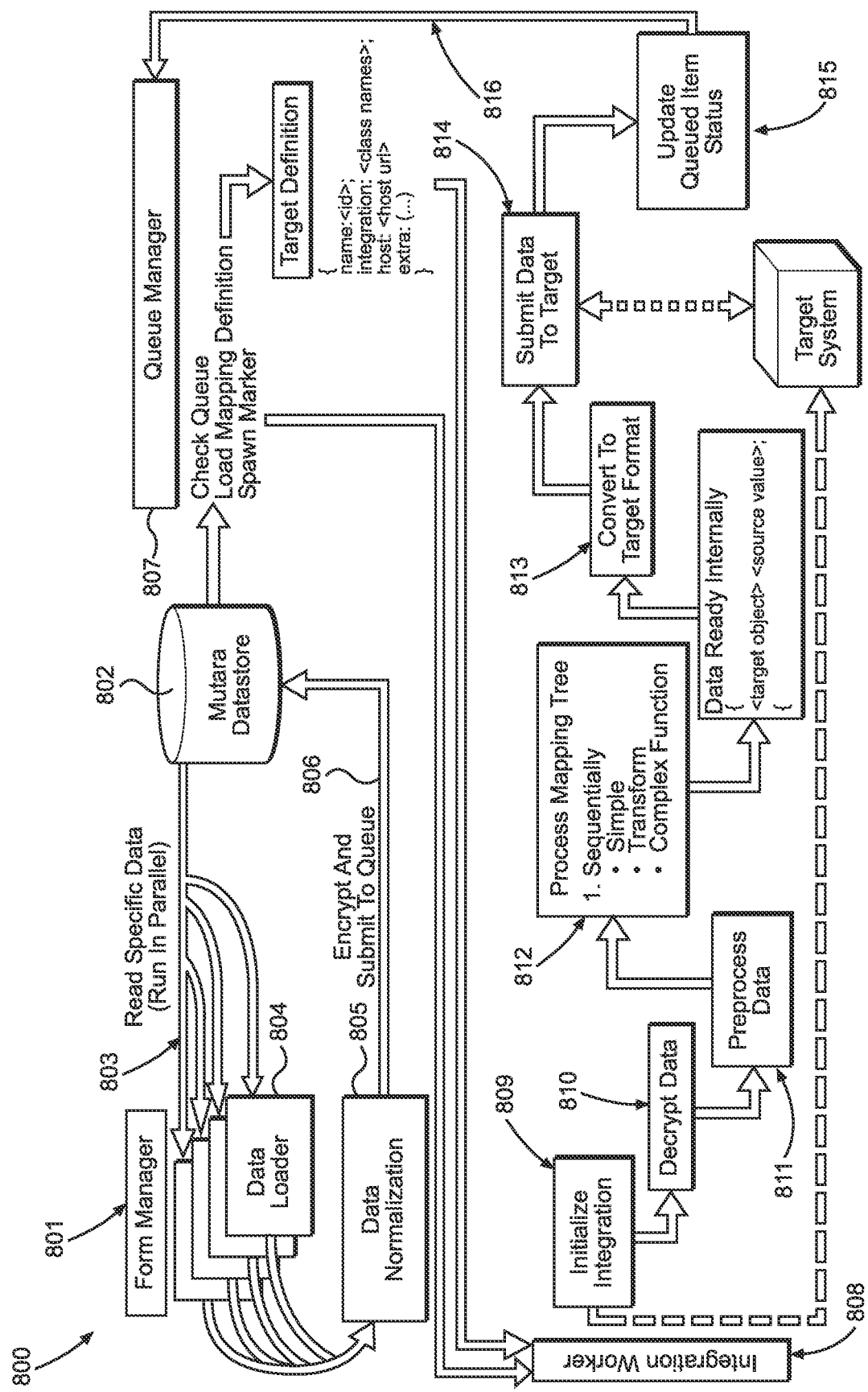

FIG. 8. is a diagrammatical representation of one embodiment of the process flow to map and integrate data to a target system via the meta-model definitional platform.

DETAILED DESCRIPTION

The approaches described in this section could be pursued but are not necessarily approaches that have previously been conceived or pursued. Therefore, unless otherwise indicated, it should not be assumed that any of the approaches described in this section qualify as prior art merely by virtue of their inclusion.

This document defines an "End User" a person who uses the software to perform a task with the scope of impact being himself/herself (entering a time report, enrolling in classes, updating his personal information), a "Power or Business User" as a person who uses the software to perform a task with the scope of impact being an area of the business and/or multiple end-users (paying employees, admitting students, fixing data entry errors, analyzing data). This document also defines an "Administrative User" as a person who uses the software to ensure that the software itself is running properly (administering security, administering product integration, administering performance). Finally, "IT User" is defined as someone who provides and maintains the computing and networking infrastructure, as well as installation and setup of business software which is necessary for the business to provide products and services to customers. Their customers are Administrative, Power, and End Users.

The process of developing, testing, and deploying is a labor-intensive process that often involves thousands of lines of code and/or multiple technologies that do not work together. This is because today's complex application encapsulates a wide range of functionality including and not limited to user interface, data management, security, audits, reporting and analytics, integration with other systems, and the ability to customize and tailor behavior to user needs and requirements. Labor intensity means higher overhead costs and longer wait times on development, testing and deployment of new applications. Therefore, new solutions are required that require little or no coding to solve these issues.

Currently, development teams either build applications directly by using lower-level development languages, such as Java, or they build applications in a hybrid model that utilize lower-level languages in combination with low-code application platforms (LCAP). However, these approaches also face limitations since developers are unable to provide their customers access to the code to modify or add functionality to the programs post-deployment. This means that missing features and capabilities must be added-on as side systems created separately, sometimes using different architectures, languages, and systems, adding complexity to the system and security vulnerabilities. Furthermore, applications are rarely designed in a tailored manner to suit each customer, but instead rely on the development teams to produce fit-all approaches that will work for the largest number of customers and end users.

Little to No Coding

Embodiments of the present technology provides systems and methods for a dynamic and customizable meta-model development platform, which includes a toolset that encapsulates all the functionality required for running an application, spanning data management, business logic, analytics, integration, security, customization, change management and user experience. This allows for greatly reduced development and support time and effort, smaller development teams, faster time to results, up-to-date customer feedback and rapid, continuous innovation and improvement of programs built with the platform. This platform allows customers to modify the program, its features, capabilities, and behaviors from the customer end, without affecting the program's key functionalities. This is possible because the toolset applied key functions (including but not limited to security rules, authentication, user experience and analytics) consistently across all applications, while allowing customers to customize and alter selected functionalities most pertinent to the customer.

Current platforms do not combine transaction processing and analytics; however, the proposed platform combines the two into a unified meta-model development platform. The meta-model development platform brings together a single set of metadata across all aspects of the enterprise application. By creating a single unified metadata model development platform that supports analytics and transaction processing, a robust engine is created that eliminates silos of code and data. This is something that is unique, because transaction processing is primarily about capturing and managing "documents", whereas analytics is primarily about finding, organizing, and getting intelligence for what the documents represent. Application development is done by providing definitions and without requiring developers to write code.

The systems and methods for a development platform approach/architecture proposed in this document produce a number of benefits including and not limited to a unified set of rules regardless of how data is presented and/or used, application development done via definitions rather than coding, agile processed applied rapidly to define, evolve and deploy functionality, the architecture being fully extensible and configurable by the customer, and allowing business users and customers to drive the behavior of the system.

The proposed meta-model development platform includes two key concepts or definitions, the meaningful data object, and the way the meaningful data object is used to perform actions in the application, both concepts are defined by the developer. The first concept, the meaningful data object encapsulates what data is handled, how it is secured, what changes have been made by customers, and the business logic that determines what should happen based on what an organization does with it. The meaningful data object is defined and includes the following definitions: the elements in the meaningful data object, its taxonomy and structure, how it is related to other data objects, how sensitive the data is (for example, each defined sensitivity level comes with its own security, encryption and handling rules), how the data is validated, what actions can be performed to the data object, and any customer modifications to the data object which includes but is not limited to: any new elements, defaulting values, hidden unused elements, new validation rules, etc.

The second key concept is the definition of the ways the meaningful data object is used to perform actions in the application. This definition includes the user experience, form factors, reporting and analytics performed, how it fits into an approval workflow, and how it is interfaced to other systems. This allows the meaningful data object to be uniform and be used consistently without having to write new code, or develop application specific logic for user experience across all form factors (desktop, mobile, assistive technologies), query and reporting within applications, presentation of analytics and dashboards related to application data, how data is integrated both into and out of the application (using a number of technologies including but not limited to XML/Soap, JSON, CSV and other integration protocols), and rules to simultaneously process large volumes of data.

In various embodiments the concept of defining the meaningful data object describes the data to be captured and used in the application. This is done by first defining each data element, this definition includes the label (including translations of the label), display formats (for example, phone number format), as well as information that drives how it should be handled to support accessibility (WCAG 2.1). Additionally, the element can be flagged as to how sensitive the data it contains to drive encryption and masking for security purposes. In various embodiments, these data elements are then assembled into meaningful data objects (such as vendors, orders, customers, payments).

These objects loosely relate to groupings of relational tables, but also include relationships to other object (for example, an order would have a relationship to a customer, a salesperson, and items).

In some embodiments meaningful data objects can encapsulate rules that define the following: what validation is required to make sure that the data is accurate, and what actions can be performed against it. The actions Create, Read, Update, Delete are automatically created for these objects, but additional ones could be created such as approve, submit, and notify.

In some embodiments, the meaningful data objects can be used to define how the data is used in the application. This includes whether the data is displayed or maintained in pages in the user interface for end-users, whether the data is integrated with other systems using standard integration technologies (SOAP, JSON, CSV). This also includes, defining whether reports and queries can be written against the data, whether analytics can be created against it (as well as its associated related objects) and whether bulk actions can be performed against sets of that meaningful data object (such as year-end closing).

Furthermore, in various embodiments, customers can extend and modify any aspect of the system, such as creating new integration points, new pages, new reports—or even modify the data objects themselves without any coding. Because this is done without coding, it is possible to take updates of the base software while keeping these customer changes as the product evolves and changes.

In various embodiments, the second key concept discussed in this document, the actions that the meaningful data object can perform in the application is then defined, these actions that the data object may perform may be related to actions to be taken within the shared infrastructure between all applications, or be within only one or more customer-facing applications, or actions that can be taken in both shared tools and infrastructure and customer-facing applications. As discussed, these actions may be related to user experience (and form factors), reporting and analytics performed, how the data object fits into an approval workflow, and how it interfaces with other systems.

Automatically Generating User Interfaces

Today's complex applications are used in a variety of ways, form factors and user personas that require user interfaces that are customizable to each user. Coding for each user separately to meet their individual needs for using the application is a labor intensive and costly process.

Currently when trying to customize or build customized user interfaces, developers must either develop completely new user interface components, utilize a UX framework to simplify the development process (examples include Angular, PHP, and JQuery) or utilize a low-code application platform, which allows a structured means of defining the components for generating the user interface.

By using the definition concepts discussed in this document, in various embodiments, user interfaces may be generated automatically from a robust set of definitions, user experiences can be created rapidly, consistently, and can be enhanced as new technologies emerge. This ensures that the experience can be incrementally enhanced over time without requiring expensive redevelopment. Exemplary use cases can include and are not limited to access requirements on laptops or personal computers, access on mobile devices, assistive technologies, and different interfaces for different types and levels of users, such as administrators, power users or simple self-service interfaces.

Typical low code platforms use a Document→View architecture (or MVC and/or hierarchical MVC), where there are definitions that form the foundation by which the UI is generated. This architecture however required a rigid definition of the components that make up this Document→View architecture, the components comprising a model (or document) that stores or makes up the data, a view that presents or displays data and a controller that validates and permits for events that occur within the architecture. Because this MVC model requires each piece to be rigidly defined, and flow hierarchically, even for existing LCAP platforms, all aspects of the development process, including features and configurations are locked-in at development time.

Various embodiments of the approach discussed in this document are different to existing solutions in that each of the tiers can be modified and all dependencies can be handled via subscription. This means that at run-time the document object can be modified dynamically (even while the end-user is accessing the user interface utilizing the document), and the UI (as well as the events) can morph in real-time. It also means that the event model can be extended as needed without code (versus a rigid model required by hierarchical relationships—which would require coding outside of the framework to handle). In this approach the view of the world (the view object) can influence what the data model looks like, also the designed controller is flexible in that the view can present things that may or may not exist in the document to it and it is validated and deployed throughout the data model by the controller. In this proposed approach, the view and the controller objects can add, modify, delete or update data and update and build the document. In some embodiments of the proposed approach the document mainly functions as data storage.

One exemplary embodiment is a billing enterprise system that may be used differently by different customers, with some customers wanting to support additional features such as segregation of accounting duties or tracking data relating to customers, that is not provided by the deployed system. The metadata configuration of the proposed platform gives customers access to change the deployed product allowing them to extend or modify the delivered data model without restriction, extend or modify the delivered user interface of each transaction without restriction, and add or modify business logic (if it does not break global policy and security rules) without restriction. All form factors utilized by the customer (mobile, desktop, assistive technologies) as well as usage roles (power user, self-service user, administrator) will inherit all these rules.

Data objects, and definitions within data objects and their validation rules may be used on the interface layer, an integration layer, in a backend system or database or any other tier of the platform software. These definitions are based on metadata which may include various UI, mobile and web development tools including angular or JQuery. Adding a tab in a user interface would require making changes in the metadata definitions, which describe what occurs in the UI or in the user experience (UX). The data object is the foundation of what the data is, how it is used and how forms and fields are defined, how they relate to each other, how they are validated, and how data is presented. This relational metadata may be stored in a relational database such one that utilizes SQL. Instead of a relational database other forms of data storage may also be used such as CSV files.

The engine that is utilized by the platform presented herein is interpretive, i.e., it does not require compiling work to function, and that functionality may be adjusted or modified by the tool or application/software itself. Furthermore, the technologies presented herein may be software as a service in a cloud system, rather than a local machine. The meta-level and metadata control in this cloud system allows changes to be made to any aspect of the application. Whereas in traditional code writing, new functions must be coded for and programmed by a developer, the current technologies in contrast allow new applications, as well as completely new user interfaces to exist merely by modifying or adding new tables, definitions, or values. This model allows a non-technology savvy user to modify values and definitions via forms, or relational tables and be able to produce new user interfaces, tabs, pages, and the like. Even creating completely new forms or applications with completely different variables, relationships or values.

Integration Between Systems

Development platforms and other integrated business-to-business software solutions face long term problems due to variability between data interfaces of two integrated systems. As each system and environment are updated and managed, the data interfaces can change and managing the data interchange in traditional tools adds another layer of complexity and testing to the system. Integration between existing enterprise software systems is a difficult task which can be expensive to implement. Customers who need to integrate older enterprise systems with newer cloud-based applications are faced with the most difficulty because older systems are usually based on incomplete or non-existent integration frameworks. This requires the customers to spend potentially large amounts of money for one-off integration solutions which are not extensible nor easily maintainable.

Current industry standard solutions either make use of general-purpose data Exchange, Transformation, and Load (ETL) tools and proprietary integrations made by the business software vendors. However, most of these tools are designed to perform individual tasks such as one-time conversion of data to a new application or bulk data transfers between transactional and analysis systems. Individual transaction conversions tend to be unoptimized and computer resource intensive. These solutions can be practical for large data conversions, but are not ideal for daily transactional data as they are rigid and unable to adapt to changing requirements. Another pitfall with ETL solutions is that they require specialized training to manage the definitional aspect of the transformation. This knowledge is easily lost amongst the detail of ETL toolsets. Newer cloud-based tool sets have issues related to optimization of both individual transactions and integration with target systems.

ETL Tools approach solving transformation issues between systems from the perspective of set-based transactional data. This is based on traditional RDBMS data modelling where the structure of data is rigid and bulk processing is very fast. This performs very well on data that is structured, inflexible and predictable but has serious issues when the data structure is complex, or transformations require specific knowledge to resolve the transformation.

Presented herein are solutions to this problem that apply business knowledge (knowledge of transactions and transaction types to a specific industry) to an individual transaction and scaling the processing of the smaller individual transactions in bulk only when necessary. This allows for much more flexibility in each transaction, but leverages burst scalable architectures when needed ensuring more efficient processing.

An illustrative example of the term "business knowledge" as used in this document is the knowledge of an accountant. With a transaction that spans multiple accounting periods, there are different ways to account for associated tax and liability of a user, in this case an accountant must make adjustments based on changing company policy or other accounting standard. There is also the issue of sales tax reporting which may be done at a different time to the accounting period. Each interaction between business desire and outside requirements may change at any time and business software needs to be easy to modify to handle those changes.

When applied to software, a business user of the software should be able to use their understanding of the goals and objectives, i.e., business knowledge, to modify the data, provide guidance, and resolve any data exceptions that may arise. This should be an easy process requiring a basic understanding of logical expressions and clear understandable data references as disclosed by the technologies herein. The systems and methods presented herein provide dynamic data mapping using a customer's business knowledge to modify or transform data into the desired structure for an external system.

Traditional ETL tools use metadata and use mapping of data definitions to perform the requisite transformations before loading data into the target system. The presented technologies also uses metadata to describe the transformation but isolates the transformation to a specific piece or set of related data. This allows the definition for each piece of data to exist outside of the scope of the complete ETL definition. In various embodiments this is done by using definitions and definitional relational data objects to define and isolate specific pieces of data from each other.

At runtime, the presented technologies load the set of target related definitions into a memory cached definition to be executed on all incoming data regardless of whether the data is single transaction or bulk data transfers.

General-purpose tools made to integrate data between systems can be costly and usually have proprietary processing logic which can simplify mapping and transforming data into a low-code format and can provide high speed but can be difficult to use and maintain. The goal of these tools is mainly bulk transformation of data between systems or pipelining data from multiple systems into a target system. Typically, this requires an 'Administrative User' skillset and specialized training. The other solution of proprietary integration is where business software providers will include, sometimes with an extra charge, built-in tools to perform a limited set of transformations to specific targets. Proprietary integrations can easily become outdated as the target systems progress or are reconfigured.

Various embodiments of the proposed solution use a persistent data storage mechanism (database) to maintain a single relational entity referenced by a logical name representing the data integration endpoint. A standardized JSON schema is defined to allow multiple data entities represented as data in the RESTful service to be mapped to the target systems data fields and actions, i.e., the proposed platform and approach is defining a well-known object (JSON object). Then when data comes through at REST for example through a web form and in a format (or language or type) known to the platform interface, this data element is then mapped to both specific and processed fields in the target system.

Mapping of data is scoped and encapsulated to allow execution of a basic set of transformations which can lookup data from the target system(s) as well as perform cross system datatype data exchange. Data can be of primitive types (string=>int=>date, etc.) or of complex transient types. Data manipulated in by this method is bi-directional and deterministic, this means that data manipulated on one system is flagged and can be viewed as manipulated on the other system.

In some embodiments, the mapping of information between business software systems is done using a mapping table to identify distinct data elements from the source and provide them to the low-code definitions in the dynamically loaded RESTful transformation service. The execution of the data pipeline transformation software is managed by the underlying proposed platform's software and can be dynamically invoked, i.e., the controllers that are needed are activated and utilized as needed. This allows the integration between the JSON schema and target business software environment to be updated independent of the application logic.

Business knowledge can be applied to the information logically. In most cases, this is simply making the connection between individual pieces of data between two systems. lname=legal_last_name. In other cases, there needs to be simple logic applied to transform the data. In this case, the technologies presented are collecting parts of hyphenated last names independently while the target system requires the fully hyphenated name. For example, last_first, last_second=>(last_first+'-'+last_second)=>legal_last_name. But when there is no optional second part, a non-hyphenated name? The customer will need to know the logic to perform the appropriate transformations so that artifacts such as the hyphen are no included when there is no second last name, i.e., last_first, last_second=>(last_first+(if last_second=="then" else '-'+last_second))=>legal_last_name.

Each time knowledge is applied, more complexity is added. In the case of strict no-code environments, this requires logic actions between each state of data in order to adhere to the no-code principle. For most general users, this type of strict adherence is too abstract and difficult to understand. In a low-code environment, like the present technologies, the logic can be procedurally incorporated into a function that is defined in the same manner as a data mapping definition. This requires that the called function have access to the entire set of data in the initial state and that the function is called in the proper sequence so that data state changes are managed properly.

In various embodiments, the platform presented herein provides helper functions to both isolate the user code from the main procedural logic and to create a secure separation between the data and the user functions. This gives stability and security to both the main architecture and the user code.

In some embodiments the definitional structures are persisted in RDBMS tables, are loaded and converted to another format such as a JSON structure in memory, allowing the definitions to be reused dynamically as the application scales. The definitions are split between different types, including simple, transformed, and complex.

In several embodiments, definitions are mapped via JSON, or other flexible and easily transformable data structures that may be transformed to other formats. In some embodiments, the systems and methods presented herein may map data starting with the target data structure back to the source data. This ensures that the final output of the mapping fulfills the data contract of the target system. It also quickly identifies data voids in the platform; places where data are not currently collected. The JSON keys (or other definitional data types) are based on the target value names. JSON values may be either a simple data value name, inline transformation (ex: date formatting, mathematical operations), or low-code complex conversions.

Definitional elements of the data mapping can be managed independently allowing for reuse of individual data element mapping across multiple target types and systems. The platform also allows for defining complex elements as a single definitional element. Complex elements are typically related information where source data elements are run through low-code functions to convert to the appropriate values in the JSON (Or other used data type) structure. The overall definitional structure mirrors closely the target data structure. This allows for a quick review of the target system and in-depth testing of the integration. Dummy data can be used in the service loop to perform integration testing.

Mappings can also include target nodes or data elements that are to be removed or set to an empty value. This is necessary as integration targets may require empty values for certain data elements or those elements to be completely removed for the integration to function properly. This is completely dependent on the target environment.

In many embodiments, the proposed platform uses a persistent data storage mechanism (e.g., a database) to maintain a set of references to RESTful services which are loaded via standard application logic during the execution of the application as requested by the decoupled application UI (for example, the application UI on the customer end). The underlying platform infrastructure (which is consistent and uniform and shared across all applications) is asynchronous first, allowing the decoupled RESTful services to process in parallel to provide the necessary speed of transformation. This means that the application on the customer's server system, and the underlying infrastructure on its own server system can run in parallel and carry out mapping in parallel.

One exemplary embodiment of the presented technologies will describe the process of mapping input data from a student to identify whether the student is eligible for residency discounts and financial aid. A school is in a certain state, for example in Oklahoma, and the start of the Summer 2021 term is Jun. 15, 2021. Some data and their corresponding values are provided by the student including address, length of time living at address, military status, whether living in military housing, what school term student is registering for. To determine whether the student has residency in the state, there needs to be a calculation based on the aforementioned data values. If for example they are active military living near the school, then because of the military status and location of the school, there is no need to calculate any further since they are living on base near the school, their permanent address is ignored in that circumstance. Another student may not be an active military member, and therefore the length of time at the current residential address must be checked. The function requires the entire dataset be passed to the complex function and the data returned be in JSON format. This is a simplified example that handles all of the special cases and updates the student data with the new value:

```
residencyCheck ( studentData, targetData ) {
        // Not a resident by default
        targetData.questions.isResident = false;
        // Military living in OK
        if (studentData.personal["mad_person-personal"].extra.military == 'ACTIVE' && studentData.personal["mad_person-
personal"].extra.livingMilitaryOK) {
                targetData.questions.isResident = true;
        }
        // if in OK
        else if (studentData.address["mgd_address-state"] == 'OK' | | (studentData.address["mgd_address"-country"] != 'USA'
&& studentData.localAddress[" == 'OK') ) {
                targetData.questions.isResident = (studentData.address.beginningOK >
(this.lookupTermStartDate(studentData.education.term) – 365));
        }
        return targetData;
}
```

The logic of the function can become more and more complex, but the code used can only access the provided data, i.e. the values provided, and the definitions that will be output. The data created and/or changed is returned by updating the existing student data.

The function above determining student residency may be incorporated into a final definition in the format that the target system, for example college administrator form, requires and is output in this manner:

```
{
    personal : {
        military: mad_person-personal.extra.military,
        lname : mad_person-personal.legal_last,
        fname : mad_person-personal.legal_first,
        fullname: mad_person-personal.legal_first + ' ' +
        mad_personal-personal.legal_last,
    },
    address: {
        line_1 : mgd_address-address_line_1,
        line_2 : mgd_address-address_line_2,
        city: mgd_address-city,
        state: mgd_address-state,
        country_code: mgd_address-country
    },
    localAddress: {
        line_1 : mad_person-personal.extra.local.address_line_1,
        line_2 : mad_person-personal.extra.local.address_line_2,
        city : mad_person-personal.extra.local.city,
        state: mad_person-personal.extra.local.state
    },
    questions: {
        isResident : residencyCheck ... <see example above>
    },
```

The definition is based on the target system or software requirements and that there may be data in the source that is not included in the target directly. An example of this is the value for livingMilitaryOK in the source data. The data is collected from the user and used exclusively within the function to fulfill the question.isResident value from within the function itself, i.e., the data provided is used to infer new data or answers to new questions that the target system does not ask or require, but the source platform uses it to produce inferences based on applied business knowledge. This business knowledge may use machine learning algorithms over many uses and cycles to infer or create new data based on patterns detected or business knowledge from the target software or system or other target software or systems.

Based on the integration function that is utilized, the data received from the target system may be broken up into different pieces, and definitions are individually compared with source definitions. Then these are fed through specific functions to provide outputs when necessary. Some output data is produced through a simple definition check, others through a combination of multiple definitions, and others run through more complex functions. This means that the simple definitions may stack into more complex definitions and outputs which in turn stack into functions that may be required by the target system. Functions may infer new information that may be used for output data or to complete or add new definitions or data to the source definitions/meaningful data object and their one or more definitions. In various embodiments, these integration maps are specific orderings of the definitions, complex definitions of functions that must come one after the other and are mapped to produce desired outputs for target systems. Furthermore, changing the order or definitions, or functions produce answers to different questions. For example, determining residency first, might cause financial aid status to be determined, since other information apart from residency may not be required. The mapping checks what data is provided to answer what questions and in many integration maps, the data output solely depend on the information and values provided by the target system request or input data object.

Because these integration mappings are metadata based, these definitions and blocks of definitions and mappings may be used from one application/one target system to another to another. Using the same metadata, and converted to different target systems. For example if a second system wanted a residency check in their system, then they would merely use the platform's user interface, which then uses the presented platform's residency integration map and applies it to the other system. This means that new functions, user interfaces and even full applications can be added by any user of a target system, by making use of the definitional platform's inherent ability to scale by adding multiple blocks of definitions, complex definitions, and functions that are placed together in specific integration maps.

These systems and methods improve functionality of underlying technologies and hardware systems. Because definitions are cached, they are loaded in memory and are used without having to be reloaded. Definition changes are rare, and therefore loaded definitions may be utilized across separate and distinct platforms, applications, and systems without having to reload any data. Furthermore, scaling is only done as necessary, no excess processes run. Each request is submitted and sits in a queue and is managed by a queue manager. Each request is then matched to its integration map or integration definition type and atomized based on the definitions provided. The integration worked that is generated to run the process is then terminated. These atomic processes follow pre-set maps and therefore do not need management, they just produce outputs. This also allows for automatic scaling, which only takes up resources when necessary, for example when additional functions are executed or processed based on the data inputs or outputs produced.

Furthermore, while individual transactions are saved individually, an integration service or worker is running which checks for new transactions, they will be loaded in bulk and passed to the queue manager as one data file or object. This basically defers high order reporting, i.e., reports are not run to determine what functions or definitions should be run, based on filtered criteria an integration type definition is selected. The queue manager creates specific type definitions by processing the data received row by row. Then specific integration type definitions or integration maps are executed based on outputs from the bulk integration map functions executed or from other filtered criteria that determine other integration type definitions.

Automatic and Standardized Encryption of Sensitive Data

Security issues are well known in software enterprise solutions, and sensitive data in business software systems that needs to be exchanged with other systems is vulnerable to exposure if the data is not properly encrypted and managed. Typical business software systems have general mechanisms to prevent data exposure by providing data hiding and database level encryption. But individual data element encryption can be costly and impact overall system performance while providing a single point of failure.

Other solutions in the industry include software applications that provide blanket data security by encrypting data and hashing values that are sensitive. This is typically and all-or-nothing approach as individual data element encryption is CPU costly to encrypt and decrypt individual values and the most practical approach is to encrypt the entire database and filesystem. Little thought is given to exchanging sensitive data to other systems in an ad-hoc basis. As such when sensitive data is exchanged with another business software system, the data is loaded into the system's memory unencrypted providing another vector for potential attack. Third-party software can be used to perform the exchange, but that adds cost and complexity to the environment.

In various embodiments of the systems and methods of the proposed platform, standard data exchanged between users and business system via the web use web standard encryption techniques and at this stage are at the least secure area of the system. As data progresses through system and finally ends up at rest in the data storage mechanism, the data is most secure. Data needing encryption is identified as sensitive by its definition, and when the identified data element flows from the least secure (End User) to the Application Tier (RESTful services), standard cryptography algorithms are used to create an encrypted value which then replaces the incoming data value which provides data-in-transition security, and then it stored within the data storage mechanism to provide the data-at-rest security.

In various embodiments, when the data (which is defined as sensitive or to be encrypted) is retrieved from the data store, it is maintained in the encrypted state for possible transmission. Data that is identified that way is never returned to the End User for modification, it is returned only as a data mask value. The value will only ever be decrypted by the Application Tier if and only if the value is being transmitted to a different business software system. Optionally, if the external business system is considered the system of record, the value within the application data store can be removed. Optionally the value can be deleted and never have option to send the data element again (increasing data storage).

One exemplary embodiment of this process includes data sent or received from a webpage, the data element is encrypted, and the data element is replaced in memory with the encrypted value, this value is then stored in the persisted storage mechanism at rest. Because this is not database level encryption, the database does not know how encryption occurred, it is only storing an encrypted text value, and it has no notion of decryption keys or the true value of what is stored. This means that even if database is broken into then the encrypted value is still secure since the keys and decryption library are not within the database.

In some exemplary embodiments, standard cryptography with a salt-key is utilized. In some embodiments, the encryption is a standard rotating key algorithm, so each time you encrypt the same value, the value of the encryption will always provide different values. In various embodiments, as the encrypted value is called to be transferred from rest in the database or persistent storage medium, it remains encrypted, and the decryption is carried out inside the encrypted object as the encrypted object passes through into a new object that becomes the data or format that is passed or transmitted to another system or user. In many embodiments, the user on the receiving end user does not receive the fully decrypted value, and only receives a masked value. Furthermore, the library that does the decryption, i.e., the RESTful service that does the translation, does not know the key. The library that does the decryption is separated from the flow of the data.

While the present technology is susceptible of embodiment in many different forms, there is shown in the drawings and will herein be described in detail several specific embodiments with the understanding that the present disclosure is to be considered as an exemplification of the principles of the present technology and is not intended to limit the technology to the embodiments illustrated.

FIG. 1 illustrates one embodiment of the major components of the development platform 100, which includes the meaningful data object 110, its definitions and associated rules and definitions and associated rules for user experiences 115, bulk processing 120, analytics 125, query and reporting 130 and integration points 135 for the specific meaningful data object 140.

FIG. 2 illustrates one exemplary embodiment of the proposed development platform's approach for product development 200 in this document vs. the current industry standard approach 250. This comparison shows how the fundamental capabilities within the platform—inheriting standard definitions in a centralized manner—allows application development to occur without having to do low-level coding. In the proposed platform's tools, the application developer defines through metadata the rules for which the application should work—regardless of how that will be applied for using data in the application. In the industry standard approach those rules must be recreated for each way the data is used. The proposed approach splits the customer-specific application definitions from those of the underlying 90% shared infrastructure 220, which is maintained independently from the applications 230.

FIG. 3 illustrates one exemplary embodiment of the proposed development platform's approach 300 for incorporating and adapting to new technologies vs. the current industry standard approach 350. This comparison shows how the platform would incorporate additional definitions 310 to the model to add augmented reality capabilities. In the customer-side applications/products 320, where augmented reality should be exposed, incremental settings are made to enable the new functionality in the client application framework. In the industry standard approach, augmented reality would need to be developed separately into each area where it would be exposed 360.

FIG. 4 illustrates one exemplary embodiment of the proposed development platform's approach 400 for addressing security vulnerabilities and adding security capabilities vs. the current industry standard approach 450. In the proposed development platform's approach, all security functionality and related definitions are centralized in the shared infrastructure toolset 410 and not in the customer-side applications 420. This means that across the whole platform, there is only one place where the security code is written and executed. For example, when defining a field such a social security, the metadata allows you to set the risk to the highest level. From that point, the platform will enforce a set of rules whenever and wherever this data is used which include the user interface, the data at rest, integration technologies and span methods of protecting the data (encryption, masking, logging, MFA, et al.). As such, if a security vulnerability is identified, it can be addressed in the toolset and any part of the application affected would automatically utilize the new functionality.

In the industry-standard method 450, the security code for each part of the application is intermingled 460 with the code for all other areas. This means that when addressing a security vulnerability, the software company must audit the code to find every place at risk, develop fixes in each of those places, and test. This means that fixing vulnerabilities are both time consuming and expensive for the software company. And, while this is occurring the customer is running the software with that vulnerability exposed.

FIG. 5 illustrates an exemplary architecture 500 for practicing aspects of the present technology that provides a more detailed view of aspects of the system. The architecture comprises a server system, hereinafter "system 505" that is configured to provide various functionalities, which are described in greater detail throughout this document. Generally, the system 505 is configured to communicate with client computing devices, such as client computing device or business server system 510. An example of a computing device that can be utilized in accordance with the present technology is described in greater detail with respect to FIG. 6.

The system 505 may communicatively couple with the client computing device or business server system 510 via a public or private network, such as network 515. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 515 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital, or analog interface or connection, mesh or Digi® networking.

The system 505 generally comprises a processor, 530, a network interface 535, and a memory 540. According to some embodiments, the memory 540 comprises logic (e.g., instructions) 545 that can be executed by the processor 530 to perform various methods. For example, the logic may include an optional user interface module 525 as well as the platform engine 520 which may include any of the platform's meaningful data objects definitions and configurations, the runtime engine, system-to-system mapping instructions and functionality, automated user interface rules, and may include any of the definitions, data structures, architectures, rules and logic that are presented in FIGS. 1-4 that are configured to provide the functionalities described in greater detail herein including all aspects of the systems and methods of the dynamic and customizable meta-model development platform.

It will be understood that the functionalities described herein, which are attributed to the system 505 and platform engine 520 may also be executed within the client computing device or business server system 510. That is, the client computing device or business server system 510 may be programmed to execute the functionalities described herein. In other instances, the system 505 and client computing device or business server system 510 may cooperate to provide the functionalities described herein, such that the client computing device or business server system 510 is provided with a client-side application that interacts with the system 505 such that the system 505 and client computing device or business server system 510 operate in a client/server relationship. In some embodiments, complex computational features may be executed by the system 505, while simple operations that require fewer computational resources may be executed by the client computing device or business server system 510, such as data gathering and data display.

FIG. 6 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network (e.g., network 515, see FIG. 5 via the network interface device 45 utilizing any one of several well-known transfer protocols (e.g., Hyper Text Transfer Protocol (HTTP)). While the machine-readable medium 50 is shown in an example embodiment to be a single medium, the term "computer-readable medium" should be taken to include a single medium or multiple medium (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

FIG. 7. is a diagrammatical representation of one embodiment of the separate components that make up the platform's architecture 700. Definitions and configurations 710 make up the underlying structure, the definitions and configurations 710 are the meta-model and configuration settings of the application, which include the data model, business rules, user interface(s), security, integration, reporting and analytics, these may also control and configure how associated libraries affect application behaviors. The definitions and configurations 710 may be stored on a database server, on a persistent storage device, cloud storage, any other form of storage or may also sit on memory alongside the runtime engine 720. If the application or platform is running on a client mobile device such as a cellphone or tablet, then the metadata would be sent to the application on the client device allowing the runtime engine 720 to operate as if it were doing so on the business or client-side server. The runtime engine 720 interprets the meta-model for all application behavior, these include interpreting the data model, business rules, user interface(s), security, integration, reporting and analytics etc. The meta-model may be updated or modified by developers through pages in the application (which in turn affect the runtime engine 720 that interprets this updated meta-model). These pages in the application themselves have definitions which may be accessed as allowed by the runtime engine 720. Similarly, users whether they be end users, power or business users, administrative users or IT users that are using the application or platform are able to interact with the runtime engine 720 to varying degrees depending on granted access levels, security parameters and user profile designations. These different components may be combined or overlap in different embodiments of the architecture to varying degrees.

FIG. 8. is a diagrammatical representation of one embodiment of the process flow to map and integrate data to a target system via the meta-model definitional platform 800. The platform's Form Manager 801 is responsible for interacting with the user and storing data in the one or more databases 802. The basic principle of the Form Manager 801 is to leverage parallel SQL whenever possible with the goal of making the pages for the user interact more quickly. This allows reading specific data running in parallel to increase efficiency. This parallel SQL method of data access is leveraged 803 at the user submission request time to take advantage of data caching in the RDBMS layer and to preprocess the user data into a more normalized dataset. The data acquisition step in the submission process first loads the data into memory, in many embodiments via data loader 804, and then transforms and normalizes 805 the results into a single normalized and encrypted dataset for use during the background service execution. Once the data is ready, a request 806 is made to the Queue Manager 807 to add the request to the queue.

Queue Manager 807 runs a background queue service which periodically checks the queue for data to be submitted. The result of the queue check returns both the integration type definition and all queued data. If there are any requested processes, the Queue Manager spawns individual integration services/integration workers 808 for each process based on the integration type definition. The type of integration worker 808 depends on the specific application or software the submission, request, or data object received is from (i.e., the target application, software, system, database, or computing device). The integration worker 808 is responsible for communicating with the target system as well as loading the target specific mapping definition. The mapping definition is as previously described, a JSON object with keys based on the target environment and data markers for all types, simple, transformed, and complex. Whenever possible generic conversions between JSON and the target datatype are performed. The integration is initialized 809, the data that was encrypted is decrypted 810 and preprocessed 811, where preprocessing includes converting database values to appropriate value types for storage, for example, JSON types, as well as creating default values for non-existent data. Once the transformation definition is loaded, and the preprocessing step 811 occurs, the order of processing of the transformation steps 812 is done based on the sequence of target steps. This allows for each step to be built upon data from the previous step.

After the data transformation steps 812, the data is converted 813 from the internal JSON format to the target system data format. Each integration service can use generic conversions as necessary or can make individual system level calls depending on the target environment. Once the data is sent 814, the worker service checks the status from the target system and reflects that state in the queue entry 815 for this worker. Regardless of the returned status, success or error, the worker terminates at this point 816. Any retry or restart needs to be initiated by the Queue Manager 807.

One skilled in the art will recognize that Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized to implement any of the embodiments of the disclosure as described herein.

The computer program instructions may also be loaded onto a computer, a server, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel or may be performed at different times.

The various embodiments described above, are presented as examples only, and not as a limitation. The descriptions are not intended to limit the scope of the present technology to the forms set forth herein. To the contrary, the present descriptions are intended to cover such alternatives, modifications, and equivalents as may be included within the spirit and scope of the present technology as appreciated by one of ordinary skill in the art. Thus, the breadth and scope of a preferred embodiment should not be limited by any of the above-described exemplary embodiments.

What is claimed is:

1. A computer implemented method for dynamic mapping and integration between one or more software applications via a meta-model definitional application platform, comprising: receiving from a target server, system, database, or computing device an at least one input data object or request;
    transforming the at least one input data object or request into a single normalized and encrypted dataset;
    loading from a source server, system, database, or computing device an at least one meaningful data object from the meta-model definitional application platform into a memory, the at least one meaningful data object including one or more integration type definitions and one or more target specific structural mapping definitions for enabling a dynamic mapping of the at least one input data object or request from an input JSON datatype associated with a first software application to a target datatype associated with a second software application, the at least one meaningful data object being configured to perform actions in the meta-model application platform including reporting and analytics;
    via an at least one processor coupled to the memory:
    identifying, via a queue service manager, an integration type definition of the at least one input data object or request from among the one or more integration type definitions included in the at least one meaningful data object;
    loading, based on the identified integration type definition, a target specific structural mapping definition from among the one or more target specific structural mapping definitions included in the at least one meaningful data object;
    pre-processing the at least one input data object or request comprising:
    decrypting the single normalized and encrypted dataset produced from the at least one input data object or request;
    converting data in the received at least one input data object or request to an appropriate data type for storage; and
    creating one or more default values for non-existent data in the at least one input data object or request to comply with the loaded target specific structural mapping definition;
    transforming, in sequence, the pre-processed at least one input data object or request, comprising:
    identifying one or more distinct data elements and their associated values in the pre-processed at least one input data object or request; and
    mapping the one or more identified distinct data elements according to the target specific structural mapping definition;
    generating an at least one output data object; and
    transmitting the at least one output data object from the source server, system, database, or computing device into the target server, system, database, or computing device.

2. The method of claim 1, further comprising:
    selecting one or more relevant functions to be executed on relevant identified one or more distinct data elements and their associated values, wherein the one or more relevant functions are defined by the one or more target specific structural mapping definitions; and
    executing the relevant one or more functions on the relevant identified one or more distinct data elements and their associated values.

3. The method of claim 1, wherein the identifying, via the queue service manager, the integration type definition of the at least one input data object or request comprises:
    filtering, based on the one or more target specific structural mapping definitions, the at least one input data object or request, to select a relevant at least one input data object or request, wherein relevancy requires meeting criteria set by the one or more - target specific structural mapping definitions.

4. The method of claim 1, further comprising:
via the at least one processor coupled to the memory:
inferring new relevant data or contextual information, from one or more distinct data elements and their associated values in the at least one input data object or request, based on one or more of: relationships or criteria set out by the one or more target specific structural mapping definitions, any missing values for the one or more target specific structural mapping definitions not provided by the one or more distinct data elements, any additional values and definitions provided by one or more distinct data elements that do not map on to the one or more target specific structural mapping definitions.

5. The method of claim 4, further comprising:
modifying at least one of: the identified one or more distinct data elements, their associated values, and the one or more target specific structural mapping definitions.

6. The method of claim 4 where the inferring is undertaken by a machine learning algorithm.

7. The method of claim 4, further comprising:
via the at least one processor coupled to the memory:
adding the inferred new relevant data or contextual information to the at least one output data object.

8. The method of claim 1, further comprising:
via the at least one processor coupled to the memory:
determining, based on the at least one output data object and the one or more target specific structural mapping definitions, another target specific structural mapping definition;
transforming in sequence, based on a sequence of the another target specific structural mapping definition, one or more distinct data elements and their associated values in the at least one input data object or request, where the transformations are done according to the one or more target specific structural mapping definitions;
generating an at least one other output data object; and
transmitting the at least one other output data object from the source server, system, database, or computing device into the target server, system, database, or computing device.

9. The method of claim 1, where the one or more target specific structural mapping definitions of the at least one meaningful data object include any one or more of:
one or more defined data elements, which include one or more of: an at least one label, an at least one translation, an at least one display format, and information that drive handling of support and accessibility, wherein the one or more defined data elements are assembled into relational rule-driven data objects;
an at least one defined process for using the one or more defined data elements via the relational rule-driven data objects; and
one or more defined actions that the relational rule-driven data objects can perform.

10. The method of claim 9, where at least one of: the one or more defined data elements, and the relational rule-driven data objects are extendible, modifiable, and redefinable.

11. The method of claim 1, wherein the at least one input data object or request and the at least one output data object are the same data format.

12. The method of claim 1, where the at least one output data object is presented on a graphical user interface running on the target server, system, database, or computing device, wherein the graphical user interface is produced based on a set of definitions in one or more meaningful data objects.

13. The method of claim 1, where the at least one meaningful data object comprises a data interchange format schema that includes one or more data elements of one or more data models to facilitate mapping of multiple data entries from the source server, system, database, or computing device to the target server, system, database, or computing device's data fields and actions.

14. The method of claim 1, where the at least one meaningful data object includes one or more of: an at least one mapping table, and an at least one data interchange format schema.

15. The method of claim 1 where the meaningful data object is comprised of one or more entries in a relational table database.

16. The method of claim 1, further comprising:
transforming the at least one input data object or request into a single normalized and encrypted dataset.

17. A system for dynamic mapping and integration between one or more software applications via a meta-model definitional application platform, the system comprising:
a target server, system, database, or computing device running a distinct software application to send and receive data objects and requests;
a source server, system, database, or computing device;
an at least one memory coupled to an at least one processor, the at least one processor being configured to:
receive from the target server, system, database, or computing device an at least one input data object or request;
transform the at least one input data object or request into a single normalized and encrypted dataset;
load from the source server, system, database, or computing device an at least one meaningful data object from a meta-model definitional application platform into the memory, the at least one meaningful data object including one or more integration type definitions and one or more target specific structural mapping definitions for enabling a dynamic mapping of the at least one input data object or request from an input JSON datatype associated with a first software application to a target datatype associated with a second software application, the at least one meaningful data object being configured to perform actions in the meta-model application platform including reporting and analytics;
via the at least one processor, coupled to the at least one memory:
identify, via a queue service manager, an integration type definition of the at least one input data object or request from among the one or more integration type definitions contained in the at least one meaningful data object;
load, based on the identified integration type definition, a target specific structural mapping definition from among the one or more target specific structural mapping definitions defined in the at least one meaningful data object;
pre-process the at least one input data object or request for processing comprising:
decrypt the single normalized and encrypted dataset produced from the transformed at least one input data object or request;
convert data in the received at least one input data object or request to an appropriate data type for storage; and create one or more default values for non-existent data in the at least one input data object or request to comply with the loaded target specific structural mapping definition;

transform, in sequence, the pre-processed at least one input data object or request, comprising the processor being further configured to:

identify one or more distinct data elements and their associated values in the pre-processed at least one input data object or request; and map the one or more identified distinct data elements according to the target specific structural mapping definition;

generate an at least one output data object; and transmit the at least one output data object from the source server, system, database, or computing device into the target server, system, database, or computing device.

18. The system of claim 17, where the transform in sequence by the at least one processor coupled to the memory further comprises:

select one or more relevant functions to be executed on relevant identified one or more distinct data elements and their associated values, wherein the one or more relevant functions are defined by the one or more target specific structural mapping definitions; and executing the relevant one or more functions on the relevant identified one or more distinct data elements and their associated values.

19. A non-transitory computer-readable storage medium having embodied thereon a program, the program being executable by at least one processor coupled to a memory to perform a method for dynamic mapping and integration between one or more software applications via a meta-model definitional application platform, the method comprising:

receiving, from a target server, system, database, or computing device an at least one input data object or request;

transforming the at least one input data object or request into a single normalized and encrypted dataset;

loading from a source server, system, database, or computing device an at least one meaningful data object from a meta-model definitional application platform into the memory, the at least one meaningful data object including one or more integration type definitions and one or more target specific structural mapping definitions for enabling a dynamic mapping of the at least one input data object or request from an input JSON datatype associated with a first software application to a target datatype associated with a second software application, the at least one meaningful data object being configured to perform actions in the meta-model application platform including reporting and analytics;

via the at least one processor, coupled to the memory:

identifying, via a queue service manager, an integration type definition of the at least one input data object or request from among the one or more integration type definitions included within the at least one meaningful data object;

loading, based on the integration type definition, a target specific structural mapping definition from among the one or more target specific structural mapping definitions included within the at least one meaningful data object;

pre-processing the at least one input data object or request for processing comprising:

decrypting the single normalized and encrypted dataset produced from the transformed at least one input data object or request;

converting data in the received at least one input data object or request to an appropriate data type for storage; and creating one or more default values for non-existent data in the at least one input data object or request to comply with the loaded target specific structural mapping definition;

transforming, in sequence, the pre-processed at least one input data object or request comprising:

identifying one or more distinct data elements and their associated values in the pre-processed at least one input data object or request; and mapping the one or more identified distinct data elements according to the loaded target specific structural mapping definition;

generating an at least one output data object; and transmitting the at least one output data object from the source server, system, database, or computing device into the target server, system, database, or computing device.

* * * * *